United States Patent
Haynes et al.

(10) Patent No.: US 10,457,408 B2
(45) Date of Patent: Oct. 29, 2019

(54) REUSABLE EVACUATION SYSTEM RESTRAINT

(71) Applicant: Goodrich Corporation, Charlotte, NC (US)

(72) Inventors: Timothy C. Haynes, Prescott Valley, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 386 days.

(21) Appl. No.: 15/466,615

(22) Filed: Mar. 22, 2017

(65) Prior Publication Data

US 2018/0273192 A1 Sep. 27, 2018

(51) Int. Cl.
*B64D 25/14* (2006.01)
*F16B 19/02* (2006.01)
*B63B 27/14* (2006.01)

(52) U.S. Cl.
CPC ............. *B64D 25/14* (2013.01); *F16B 19/02* (2013.01); *B63B 2027/145* (2013.01)

(58) Field of Classification Search
CPC ... B64D 25/14; B63B 2027/145; F16G 11/10; F16B 19/02; F16B 21/125
USPC .............................. 193/25 B; 244/905; 137.2
See application file for complete search history.

(56) References Cited

U.S. PATENT DOCUMENTS

| 3,897,861 | A | * | 8/1975 | Miller | B64D 25/14 |
| | | | | | 182/48 |
| 3,944,023 | A | * | 3/1976 | Fisher | A62B 1/20 |
| | | | | | 182/48 |
| 4,526,262 | A | * | 7/1985 | Malcolm | B64D 25/14 |
| | | | | | 182/48 |
| 4,567,977 | A | * | 2/1986 | Fisher | A62B 1/20 |
| | | | | | 182/48 |
| 5,871,180 | A | * | 2/1999 | Hublikar | B64D 25/14 |
| | | | | | 193/25 B |

FOREIGN PATENT DOCUMENTS

EP       0096594       12/1983

OTHER PUBLICATIONS

European Patent Office, European Search Report dated May 16, 2018 in Application No. 18162599.7-1010.

* cited by examiner

*Primary Examiner* — William R Harp
(74) *Attorney, Agent, or Firm* — Snell & Wilmer, L.L.P.

(57) ABSTRACT

A releasable restraint for an inflatable slide is disclosed, in accordance with various embodiments. The releasable restraint may comprise a first mating portion having a receptacle. The releasable restraint may comprise a second mating portion having a protrusion. The protrusion may be configured to fit within the receptacle. An adjustment fastener may be coupled to the receptacle and configured to adjust a coupling strength of the releasable restraint.

10 Claims, 8 Drawing Sheets

REUSABLE EVACUATION SYSTEM RESTRAINT

FIELD

The present disclosure relates to inflatable evacuation systems and, in particular, to restraint systems and methods for inflatable slides.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. The evacuation system may deploy from a door sill or a side of the aircraft fuselage, for example. The slide deployment is controlled by restraints placed throughout the length of the slide which release in stages in response to internal slide pressure. Emergency evacuation slides may undergo a number of deployments during development, for example, during functional testing of slide deployment.

SUMMARY

A restraint arrangement for an inflatable slide is disclosed, in accordance with various embodiments. A releasable restraint for an inflatable slide is disclosed, in accordance with various embodiments. The releasable restraint may comprise a first mating portion having a receptacle. The releasable restraint may comprise a second mating portion having a protrusion. The protrusion may be configured to fit within the receptacle. An adjustment fastener may be coupled to the receptacle and configured to adjust a coupling strength of the releasable restraint.

In various embodiments, the receptacle may comprise a first prong and a second prong. The adjustment fastener may be configured to apply a compressive force to the first prong and the second prong to adjust a width of the receptacle. At least one of the first mating portion or the second mating portion may be configured to deform in response to a tensile force being applied to the releasable restraint. The coupling strength of the releasable restraint may be a magnitude of a threshold tensile force at which the releasable restraint decouples. The second mating portion may be configured to separate from the first mating portion in response to a tensile force applied to the releasable restraint exceeding the threshold tensile force. The second mating portion may be configured to couple with the first mating portion in response to a compressive force applied the releasable restraint. The first mating portion coupled to the second mating portion may form a snap fit.

An evacuation system is also provided. The evacuation system may comprise an inflatable slide and a releasable restraint coupled to the inflatable slide. The releasable restraint may comprise a first mating portion and a second mating portion releasably coupled to the first mating portion. The first mating portion may be configured to decouple and recouple with the second mating portion.

In various embodiments, the first mating portion may comprise a receptacle having a first prong and a second prong, and wherein the second mating portion fits within the receptacle. An adjustment fastener may be coupled to the first mating portion and configured to adjust a coupling strength of the releasable restraint. The adjustment fastener may be configured to apply a compressive force to the first prong and the second prong to adjust a width of the receptacle. The coupling strength of the releasable restraint may be a magnitude of a threshold tensile force at which the releasable restraint decouples. The second mating portion may be configured to separate from the first mating portion in response to a tensile force applied the releasable restraint exceeding the threshold tensile force. The tensile force applied to the releasable restraint may be due to a pressure increase that causes the inflatable slide to inflate. The inflatable slide may be configured to unfold in response to the first mating portion separating from the second mating portion. The second mating portion may be configured to couple with the first mating portion in response to a compressive force applied the releasable restraint.

A method for deploying an inflatable slide is also provided. The method may comprise the steps of selecting a coupling strength of a releasable restraint, coupling the releasable restraint to the inflatable slide, increasing pressure within the inflatable slide; separating the releasable restraint in response to the increasing pressure within the inflatable slide, and inflating the inflatable slide.

In various embodiments, the method may further comprise the step of adjusting the coupling strength of the releasable restraint using an adjustment fastener coupled to the releasable restraint. The coupling strength of the releasable restraint may be a magnitude of a threshold tensile force at which the releasable restraint separates. The releasable restraint may further comprise a first mating portion having a receptacle and a second mating portion having a protrusion. The protrusion configured to fit within the receptacle, wherein the separating the releasable restraint further comprises decoupling the second mating portion from the first mating portion. The method may further comprise the step of recoupling the second mating portion with the first mating portion after the decoupling the second mating portion from the first mating portion. The method may further comprise the step of adjusting the coupling strength of the releasable restraint by decreasing a diameter of the receptacle. The method may further comprise, after the recoupling the second mating portion with the first mating portion, the steps of increasing pressure within the inflatable slide, separating the releasable restraint in response to the increasing pressure within the inflatable slide, and inflating the inflatable slide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, optical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

The present disclosure relates to inflatable evacuation devices, such as slides, slide rafts, life rafts, or other evacuation devices. During deployment, a plurality of restraints may aid in controlling the inflation process of the inflatable evacuation device. The restraints may be configured to de-couple in response to internal slide pressure. A releasable restraint that is reusable is provided in various embodiments. Reusable restraints may be re-coupled and used during subsequent deployments of the inflatable evacuation device.

Figure 1:
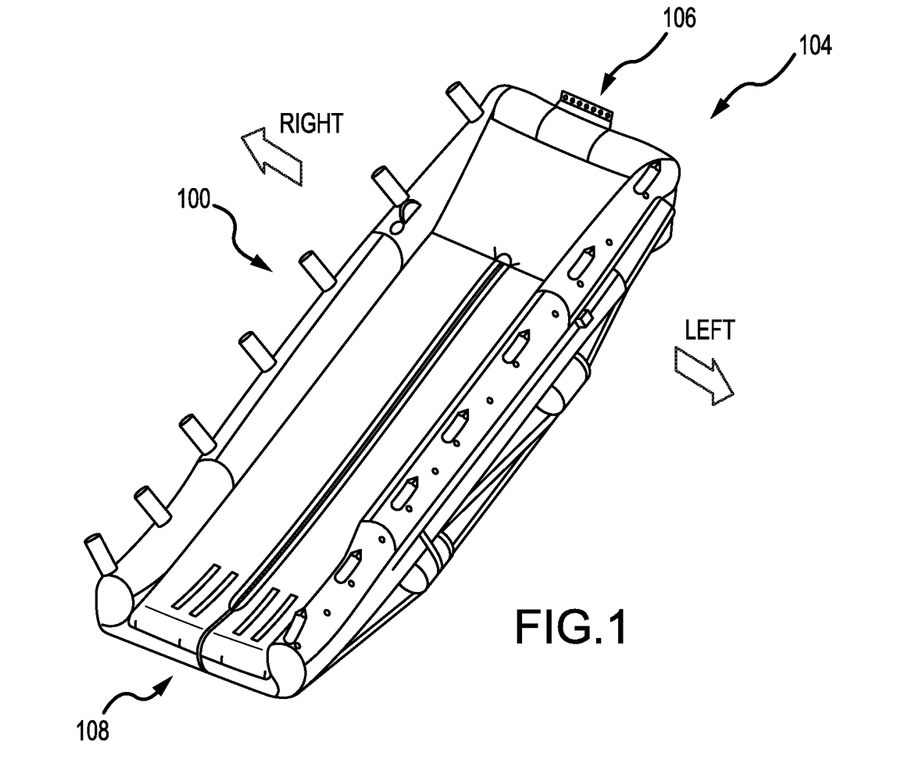
FIG. 1 illustrates a perspective view of an evacuation slide in a deployed position, in accordance with various embodiments.

With reference to FIG. 1, an evacuation system 104 is illustrated, in accordance with various embodiments. Evacuation system 104 may comprise inflatable slide 100. Inflatable slide 100 may comprise a head end 106 and a toe end 108. Head end 106 may be coupled to aircraft structure.

Inflatable slide 100 may comprise an inflatable slide. FIG. 1 illustrates inflatable slide 100 in an inflated and/or deployed position. Inflatable slide 100 may comprise a dual lane slide. However, inflatable slide 100 may comprise any number of lanes. Toe end 108 may contact an exit surface in response to inflatable slide 100 being deployed.

Figure 2:
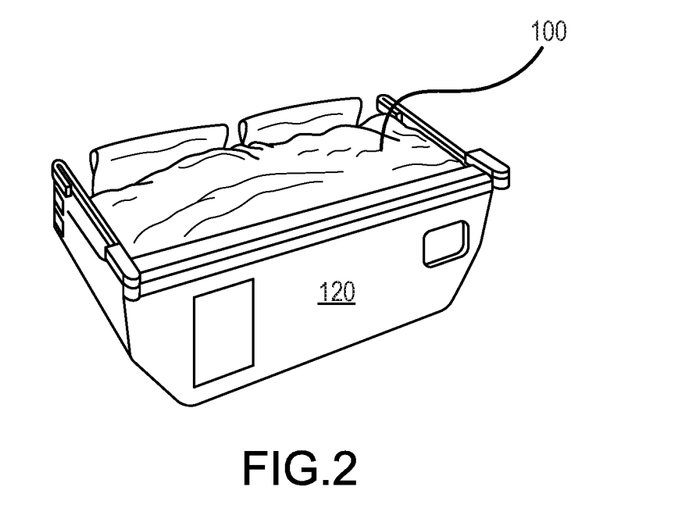
FIG. 2 illustrates a perspective view of an evacuation slide in a stowed position, in accordance with various embodiments.

With reference to FIG. 2, inflatable slide 100 is illustrated in a stowed and/or packed position. In this regard, inflatable slide 100 may be stowed in a packboard 120. In various embodiments, inflatable slide 100 may be folded in the stowed position. In various embodiments, inflatable slide 100 may be deployed from packboard 120 in response to opening an emergency exit door. Packboard 120 may be coupled to an aircraft in an installed position. Typically, a packboard 120 includes a blow-out panel which opens in response to deployment of inflatable slide 100 through which opening the inflatable may exit the packboard. In this regard, inflatable slide 100 may be configured to be deployed from an aircraft.

Figure 3A:
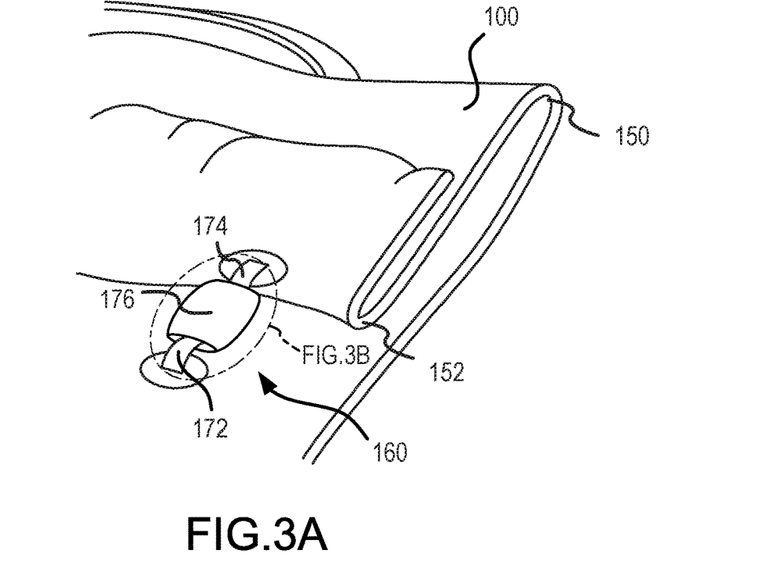
FIGS. 3A, 3B, 3C and 3D illustrate a releasable restraint aiding in retaining the inflatable slide in a folded position, in accordance with various embodiments.

With reference to FIG. 3A, inflatable slide 100 is shown in a folded position, in accordance with various embodiments. For example, inflatable slide 100 may include a plurality of folds, including first fold 150 and second fold 152, when inflatable slide 100 is in the folded or stowed position. A releasable restraint 160 may aid in maintaining first fold 150 and/or second fold 152. Releasable restraint 160 may aid in a staged deployment of inflatable slide 100. Inflatable slide 100 may unfold in response to releasable restraint 160 decoupling.

In various embodiments, releasable restraint 160 may be configured to separate in response to an internal pressure in inflatable slide 100. For example, a gas cylinder may supply a flow of pressurized fluid to inflatable slide 100 in response to inflatable slide 100 being deployed. Inflatable slide 100 may begin to inflate and an internal pressure of inflatable slide 100 may increase. Releasable restraint 160 may maintain inflatable slide 100 in a folded position until the internal pressure has increased above a predetermined threshold value. Releasable restraint 160 may separate once the internal pressure of inflatable slide 100 has increased above the predetermined threshold value. Inflatable slide 100 may unfold in response to releasable restraint 160 separating. In this regard, inflatable slide 100 may fully deploy in response to releasable restraint 160 separating.

First strap 172 may be coupled between inflatable slide 100 and releasable restraint 160. Second strap 174 may be coupled between inflatable slide 100 and releasable restraint 160. In various embodiments, first strap 172 and/or second strap 174 may comprise a rope, tape, ribbon, webbing, or any other suitable strap. In various embodiments, first strap 172 and/or second strap 174 may comprise nylon, ballistic nylon, polypropylene, polyester, cotton, or any other suitable material. For example, first strap 172 and second strap 174 may comprise a nylon webbing. In various embodiments, a cover 176 may surround releasable restraint 160. Cover 176 may comprise one or more portions. Cover 176 may comprise a fabric, such as nylon, ballistic nylon, polypropylene, polyester, cotton, or any other suitable material.

Figure 3B:
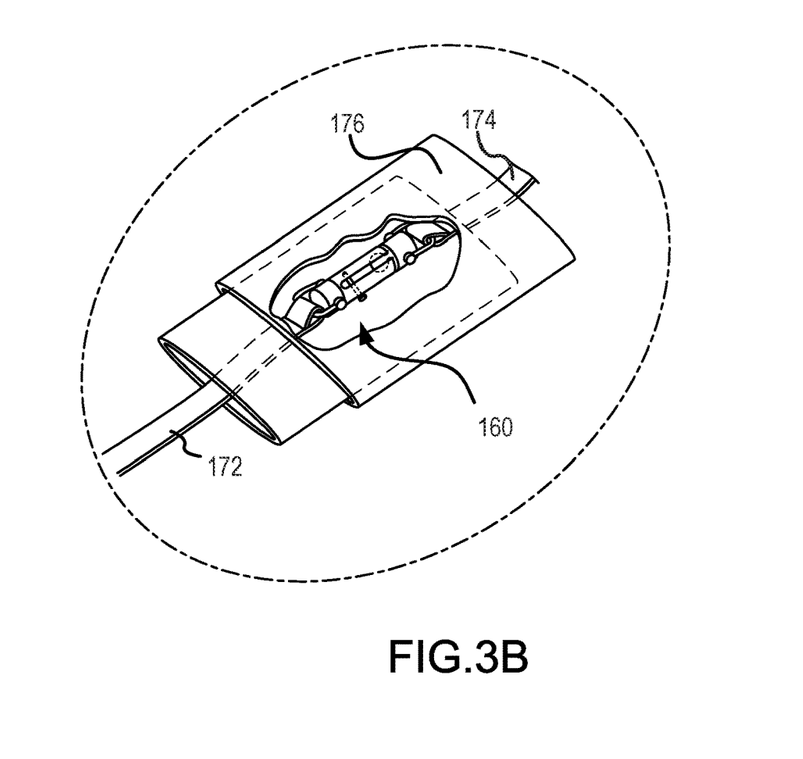
Figure 3C:
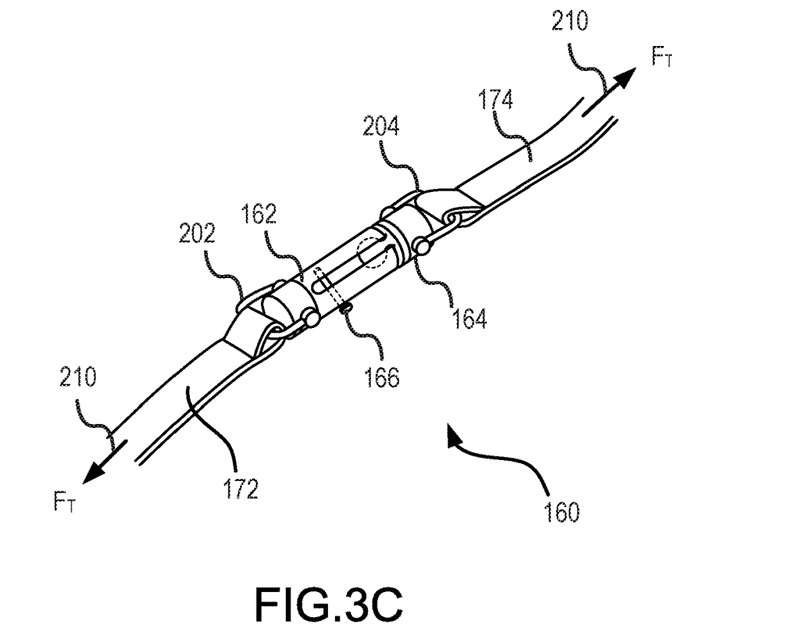

With reference to FIGS. 3B and 3C, releasable restraint 160, first strap 172 and second strap 174 are shown, in accordance with various embodiments. In various embodiments, releasable restraint 160 may include a first fastener 202 and a second fastener 204. First strap 172 may be coupled to releasable restraint 160 via first fastener 202. Second strap 174 may be coupled to releasable restraint 160 via second fastener 204. First fastener 202 and second fastener 204 may comprise shackles or the like.

In various embodiments, releasable restraint 160 may comprise a first mating portion 162, which may be a receptacle, and a second mating portion 164, which may be a protrusion or a boss. First mating portion 162 and second mating portion 164 may releasably couple together, for example, by snap fit, press fit, friction, spring or the like. First mating portion 162 may be a forked structure, pronged structure or other retention receptacle. Second mating portion 164 may be a hub, a boss, a button, hook, cantilever or the like. First mating portion 162 may be configured to receive second mating portion 164 to form a mechanical interlock.

In various embodiments, first mating portion 162 of releasable restraint 160 may comprise an adjustable receptacle having an adjustment fastener 166. Releasable restraint 160 with adjustment fastener 166 may provide a variable strength restraint where the resistance strength of releasable restraint 160 is adjusted or varied by manipulation of adjustment fastener 166. Releasable restraint 160 may resist a tensile force $F_T$ (i.e., in a direction illustrated by arrows 210) until the tensile force $F_T$ exceeds a threshold tensile force. In this regard, first mating portion 162 may decouple from second mating portion 164 in response to a tensile force $F_T$ exceeding a threshold tensile force.

Figure 3D:
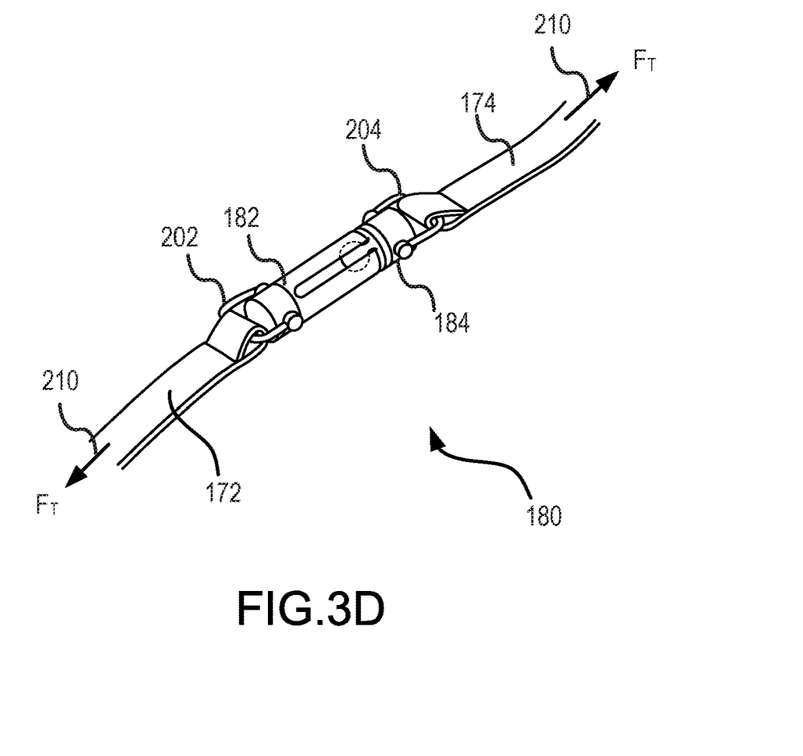

With reference to FIG. 3D, a releasable restraint 180 is shown, in accordance with various embodiments. Releasable restraint 180 may be similar to releasable restraint 160 but without an adjustment fastener 166. Similar to releasable restraint 160, releasable restraint 180 may be coupled to an inflatable slide 100 (FIGS. 1 and 2) by first strap 172 and second strap 174 and may be configured to separate in response to an internal pressure in inflatable slide 100. In various embodiments, releasable restraint 180 may comprise a first mating portion 182, which may be a receptacle, and a second mating portion 184, which may be a protrusion or a boss. First mating portion 182 and second mating portion 184 may releasably couple together, for example, by snap fit, press fit, friction, spring or the like. First mating portion 182 may be a forked structure, pronged structure or other retention receptacle. Second mating portion 184 may be a hub, a boss, a button, hook, cantilever or the like. First mating portion 182 may be configured to receive second mating portion 184 to form a mechanical interlock. Releasable restraint 180 may resist a tensile force $F_T$ (i.e., in a direction illustrated by arrows 210) until the tensile force $F_T$ exceeds a threshold tensile force. In this regard, first mating portion 182 may decouple from second mating portion 184 in response to a tensile force $F_T$ exceeding a threshold tensile force.

Figure 4A:
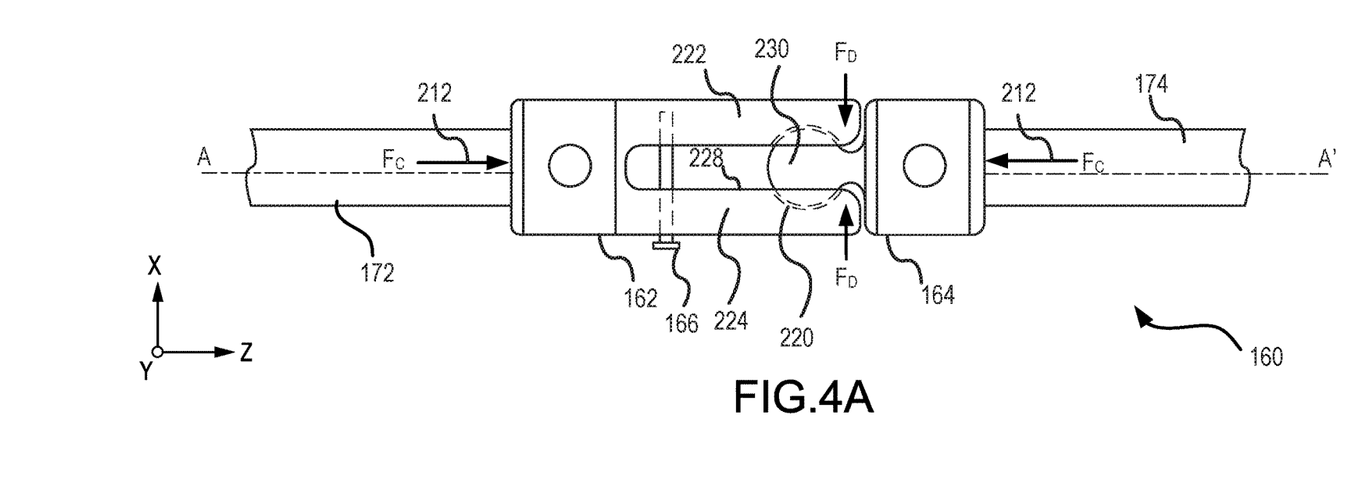
FIGS. 4A and 4B illustrate schematic views of a releasable restraint, in accordance with various embodiments.
Figure 4B:
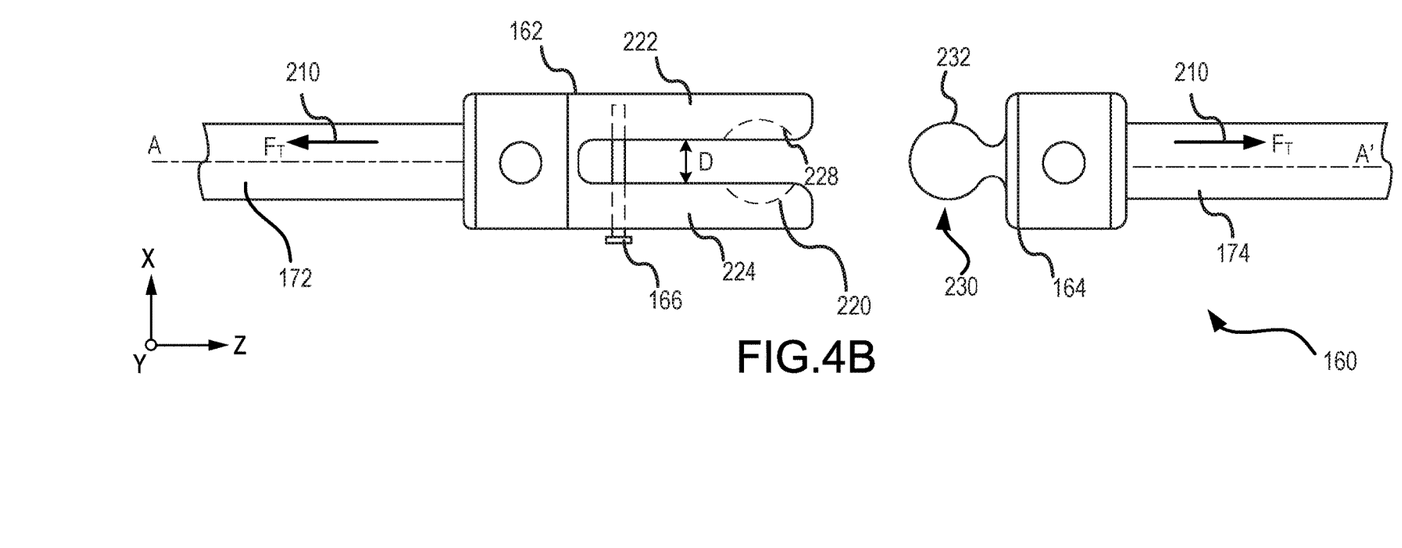

With reference to FIGS. 4A and 4B, releasable restraint 160 is shown in a coupled and a decoupled state, in accordance with various embodiments. FIG. 4A shows releasable restraint 160 in a coupled state. First mating portion 162 of releasable restraint 160 may include a plurality of prongs 222, 224, which define a receptacle 220. Stated differently, receptacle 220 comprises at least a first prong 222 and a second prong 224, which together form receptacle 220. First mating portion 162 is illustrated, by example, as having two prongs, a first prong 222 and a second prong 224. It will be understood that first mating portion 162 may have any number of prongs or may be a continuous cylinder or other shape. An inner surface 228 of prongs 222, 224 may be a mating surface of first mating portion 162. In various embodiments, at least one of first mating portion 162 or second mating portion 164 may be configured to deform in response to a tensile force being applied to releasable restraint 160 along longitudinal axis A-A'. For example, first prong 222 and second prong 224 may be semi-rigid and may be configured to flex or deform radially inward, toward longitudinal axis A-A', and/or radially outward, away from longitudinal axis A-A'. In various embodiments, prongs 222, 224 may comprise may comprise a metal, such as titanium, aluminum, steel, stainless steel, beryllium copper or other metal or non-metal material having a desired strength, stiffness, and/or flexibility.

Second mating portion 164 of releasable restraint 160 may include a protrusion 230 having a complementary shape to first mating portion 162. Protrusion 230 of second mating portion 164 is illustrated, by example, as having a substantially spherical geometry. It will be understood that protrusion 230 may have any geometry which interfaces with receptacle 220, such as a cone, cylinder, cube, irregular shape or other shape, and may have ridges, hooks or other surface features. An outer surface 232 of protrusion 230 may be a mating surface of second mating portion 164. In various embodiments, protrusion 230 may comprise metal, such as titanium, aluminum, steel, stainless steel, beryllium copper or other metal or non-metal material having a desired strength, stiffness, and/or flexibility. For example, prongs 222, 224 may be a semi-rigid material and protrusion 230 may be a rigid material.

In response to a compressive force $F_C$ (i.e., in a direction illustrated by arrows 212) applied to along longitudinal axis A-A' to first mating portion 162 and/or second mating portion 164, protrusion 230 may insert into receptacle 220 between prongs 222, 224. As protrusion 230 inserts into receptacle 220 (shown as the negative z-direction) in response to compressive force $F_C$, prongs 222, 224 may deform radially outward. More specifically, protrusion 230 may contact prongs 222, 224 and exert force on prongs 222, 224, which may deform in a radially outward direction. In response to compressive force $F_C$ exceeding a threshold compressive force, protrusion 230 may fit into receptacle 220. The threshold compressive force may depend on the deflection force $F_D$ of prongs 222, 224 and the frictional force between inner surface 228 and outer surface 232.

During deployment of inflatable slide 100 (FIG. 1), releasable restraint 160 may decouple in response to a tensile force $F_T$ (illustrated by arrows 210) applied to first mating portion 162 and second mating portion 164 by inflatable slide 100, as illustrated in FIG. 4B. In response to the tensile force $F_T$ along axis longitudinal A-A' overcoming or exceeding the threshold tensile force of releasable restraint 160, first mating portion 162 and second mating portion 164 may decouple. FIG. 4B shows releasable restraint 160 in a decoupled state. Similar to the threshold compressive force, the threshold tensile force may depend on the deflection force $F_D$ of prongs 222, 224 and the frictional force between inner surface 228 and outer surface 232. As protrusion 230 moves away from receptacle 220 (shown as the positive z-direction) in response to tensile force $F_T$, prongs 222, 224 may deform radially outward. In response to tensile force $F_T$ exceeding a threshold tensile force, protrusion 230 may exit receptacle 220.

The threshold tensile force and threshold compressive force may collectively be referred to herein as a coupling strength. For example, the coupling strength may be a magnitude of the threshold tensile force at which releasable restraint 160 decouples. A coupling strength of releasable restraint 160 may be adjusted using adjustment fastener 166. Adjustment fastener 166 may couple to first prong 222 and/or to second prong 224. Adjustment fastener 166 may be a screw, threaded shaft, bolt, and/or the like. Adjustment fastener 166 may control a distance D between first prong 222 and second prong 224, and thereby control a deflection force $F_D$ of prongs 222, 224. For example, adjustment fastener 166 may increase the distance D between prongs 222, 224 to decrease the coupling strength of releasable restraint 160. Adjustment fastener 166 may decrease the distance D between prongs 222, 224 to increase the coupling strength of releasable restraint 160. For example, adjustment fastener 166 may be manipulated to select a threshold tensile force at which first mating portion 162 and second mating portion 164 decouple. Thus, releasable restraint 160 may be configured to release in response to a predetermined threshold tensile force.

In various embodiments, releasable restraint 160 may be reusable. In response to deployment of inflatable slide 100 (see FIG. 1), second mating portion 164 decouples from first mating portion 162. Releasable restraint 160 may be reassembled by inserting second mating portion 164 back into first mating portion 162 for reuse during a subsequent deployment of inflatable slide 100. In that regard, first mating portion 162 and second mating portion 164 are configured to be releasably coupled, decoupled, and subsequently recoupled for reuse of releasable restraint 160.

Figure 5A:
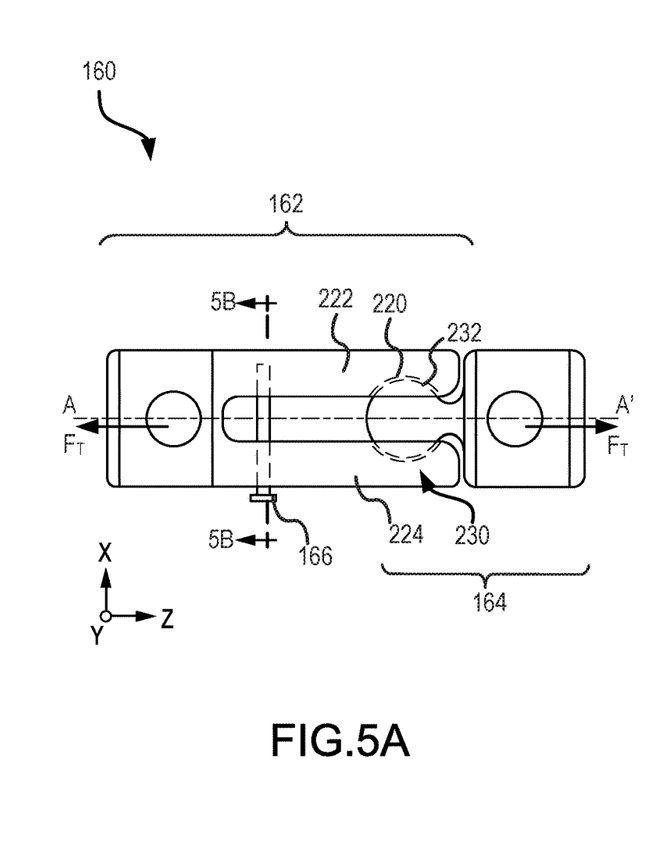
FIGS. 5A, 5B and 5C illustrate schematic views of a releasable restraint, in accordance with various embodiments.
Figure 5B:
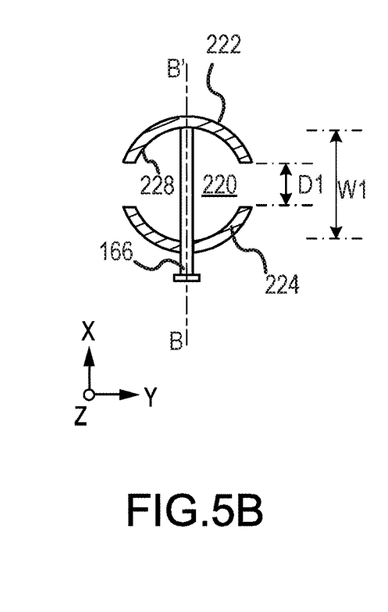
Figure 5C:
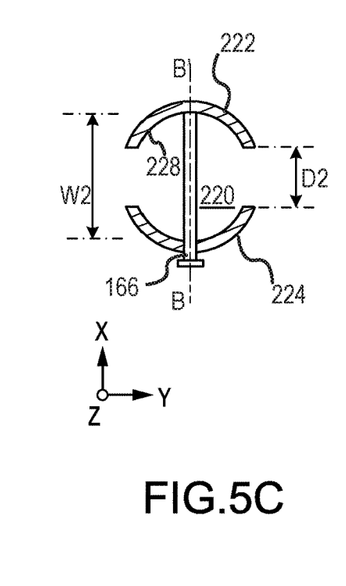

With reference to FIGS. 5A, 5B and 5C, additional views of a releasable restraint 160 are shown, in accordance with various embodiments. As discussed, first mating portion 162 and second mating portion 164 may decouple (i.e, protrusion 230 may separate from receptacle 220) in response to a tensile force $F_T$ reaching a predetermined threshold tensile force. The tensile force $F_T$ may be generated in response to the internal pressure of the inflatable slide 100, for example during inflation. The predetermined threshold tensile force may be selected by manipulating adjustment fastener 166 relative to prongs 222, 224.

FIG. 5B shows a cross section of first mating portion 162 taken along line 5B-5B from FIG. 5A. In various embodiments, first mating portion 162 may be generally cylindrical, with prongs 222, 224 forming a discontinuous cylinder. Adjustment fastener 166 may be coupled to at least one of first prong 222 or second prong 224 by threading, such that adjustment fastener 166 applies an adjustable force to first prong 222 and/or second prong 224. For example, adjustment fastener 166 may thread through a threaded aperture in second prong 224, and may extend to an inner surface 228 of first prong 222. To adjust a coupling strength of releasable restraint 160, adjustment fastener 166 may be rotated about its axis B-B'. Rotating adjustment fastener 166 may increase or decrease the length of adjustment fastener 166 disposed between first prong 222 and second prong 224. A distal end of adjustment fastener 166 may contact inner surface 228 of first prong 222 to apply a force to inner surface 228 of first prong 222 in a radially outward direction (positive x-direction). In that regard, adjustment fastener 166 may push first prong 222 away from second prong 224 and may cause receptacle 220 to expand.

For example, adjustment fastener 166 may be positioned such that first prong 222 and second prong 224 are separated by a first distance D1, and such that receptacle 220 has a first width W1 (FIG. 5B). In various embodiments, adjustment fastener 166 may be positioned to apply a greater force to decrease the coupling strength of releasable restraint 160. As illustrated in FIG. 5C, adjustment fastener 166 may be positioned such that first prong 222 and second prong 224 are separated by a second distance D2, which is greater than the first distance D1, and such that receptacle 220 has a second width W2, which is greater than the first width W1. The decreased coupling strength of releasable restraint 160 results in releasable restraint 160 separating at a lower threshold tensile force.

Figure 6A:
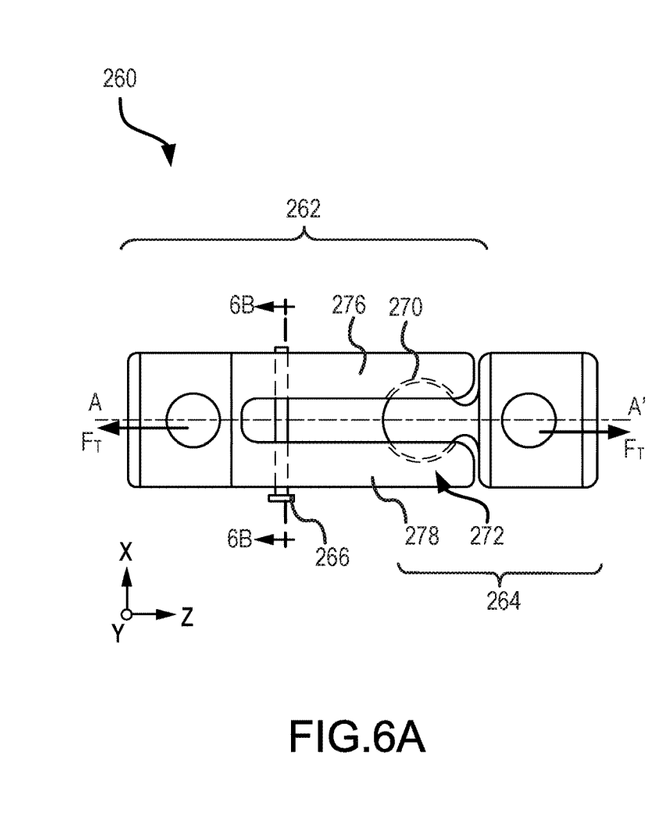
FIGS. 6A, 6B and 6C illustrate schematic views of a releasable restraint, in accordance with various embodiments.
Figure 6B:
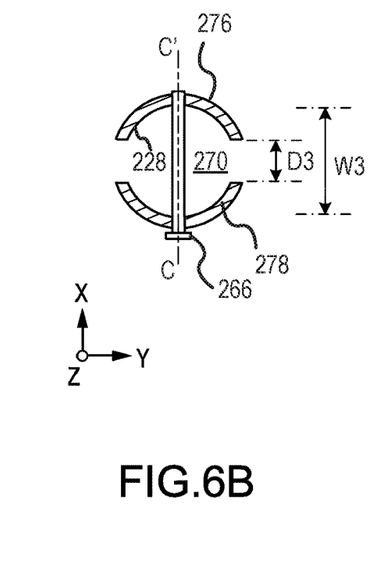
Figure 6C:
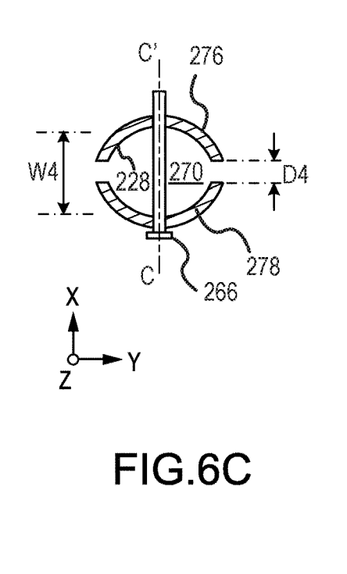

With reference to FIGS. 6A, 6B and 6C, a releasable restraint 260 with adjustment fastener 266 is shown, in accordance with various embodiments. Releasable restraint 180 may be similar to releasable restraint 160 and may include an adjustment fastener 266. In various embodiments, releasable restraint 260 may comprise a first mating portion 262, which may be a receptacle, and a second mating portion 264, which may be a protrusion or a boss. First mating portion 262, which may include a receptacle 270, may be configured to receive second mating portion 264, which may include a protrusion 272, which may to form a mechanical interlock. Releasable restraint 260 may resist a tensile force $F_T$ until the tensile force $F_T$ exceeds a threshold tensile force. In this regard, first mating portion 262 may decouple from second mating portion 264 (i.e, protrusion 272 may separate from receptacle 270) in response to a tensile force $F_T$ exceeding a threshold tensile force. As discussed, a tensile force $F_T$ may be generated in response to the internal pressure of an inflatable slide, for example during inflation. The predetermined threshold tensile force may be selected by manipulating adjustment fastener 266 relative to first mating portion 262.

FIG. 6B shows a cross section of first mating portion 162 taken along line 6B-6B from FIG. 6A. In various embodiments, first mating portion 162 may be generally cylindrical, with prongs 276, 278 forming a discontinuous cylinder. For example, receptacle 270 may comprises at least a first prong 276 and a second prong 278, which together form receptacle 270. Adjustment fastener 266 may be coupled to at least one of first prong 276 or second prong 278 by threading, such that adjustment fastener 266 applies an adjustable compressive force to first prong 276 and second prong 278. For example, adjustment fastener 266 may thread through a threaded aperture in second prong 278, may extend to first prong 276, and may thread through a threaded aperture in first prong 276. To adjust a coupling strength of releasable restraint 260, adjustment fastener 266 may be rotated about its axis C-C'. Rotating adjustment fastener 266 may increase or decrease the compressive force applied in a radially inward direction to first prong 276 and second prong 728. In that regard, adjustment fastener 266 may pull first prong 276 toward second prong 278 and may cause receptacle 270 to narrow. For example, adjustment fastener 266 may be positioned such that first prong 276 and second prong 278 are separated by a first distance D3, and such that receptacle 270 has a first width W3 (FIG. 6B). In various embodiments, adjustment fastener 266 may be positioned to apply a greater compressive force to increase the coupling strength of releasable restraint 260. As illustrated in FIG. 6C, adjustment fastener 266 may be positioned such that first prong 276 and second prong 278 are separated by a second distance D4, which is less than the first distance D3, and such that receptacle 270 has a second width W4, which is less than the first width W3. The increased coupling strength of releasable restraint 260 results in releasable restraint 260 separating at a higher threshold tensile force.

Figure 7A:
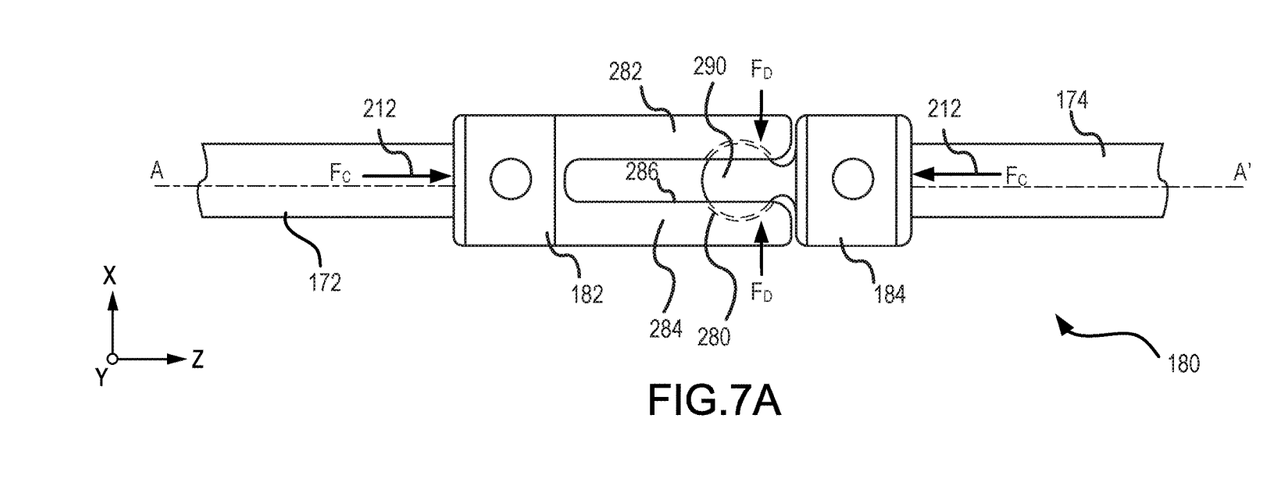
FIGS. 7A and 7B illustrate a schematic view of a releasable restraint, in accordance with various embodiments.
Figure 7B:
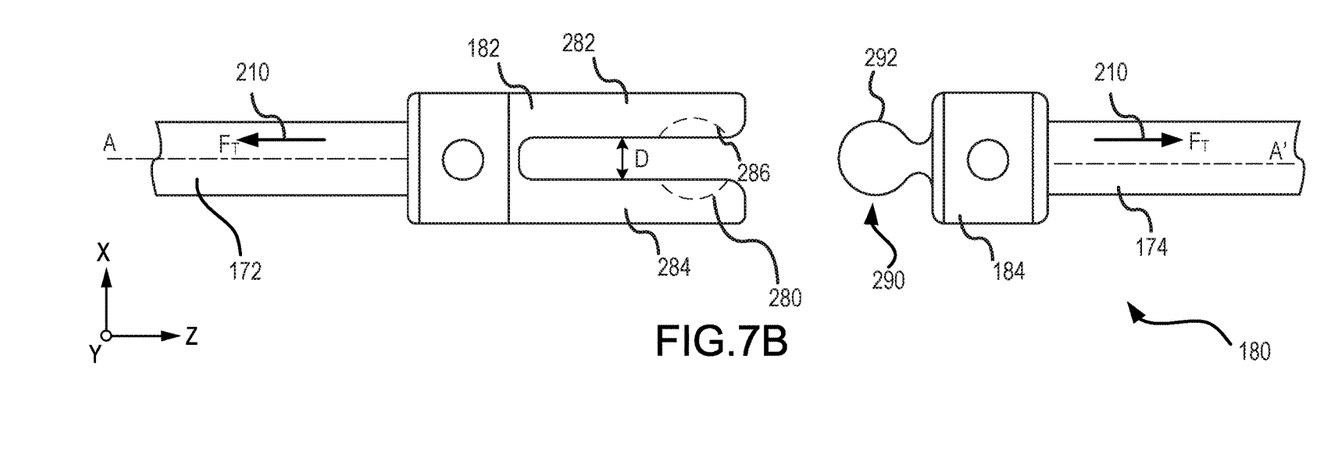

With reference to FIGS. 7A and 7B, additional views of releasable restraint 180 from FIG. 3D is shown in a coupled and a decoupled state, in accordance with various embodiments. First mating portion 182 of releasable restraint 180 may include a receptacle 280. In various embodiments, receptacle 280 may be discontinuous and defined by plurality of prongs 282, 284. First mating portion 182 is illustrated, by example, as having two prongs, a first prong 282 and a second prong 284. It will be understood that first mating portion 182 may have any number of prongs or may be a continuous cylinder or other shape. An inner surface 286 of prongs 282, 284 may be a mating surface of first mating portion 182. Second mating portion 182 of releasable restraint 180 may include a protrusion 290 having a complementary shape to first mating portion 262. Protrusion 290 of second mating portion 184 is illustrated, by example, as having a substantially spherical geometry. It will be understood that protrusion 290 may have any geometry which interfaces with receptacle 280, such as a cone, cylinder, cube, irregular shape or other shape, and may have ridges, hooks or other surface features. An outer surface 292 of protrusion 290 may be a mating surface of second mating portion 184.

FIG. 7A shows releasable restraint 180 in a coupled state. In response to a compressive force $F_C$ (i.e., in a direction illustrated by arrows 212) applied to along longitudinal axis A-A' to first mating portion 182 and/or second mating portion 184, protrusion 290 may insert into receptacle 280 between prongs 282, 284. In various embodiments, as protrusion 290 inserts into receptacle 280 in response to compressive force $F_C$, prongs 282, 284 and/or protrusion 290 may deform in a radial direction. In response to the compressive force $F_C$ exceeding a threshold compressive force, protrusion 290 may fit into receptacle 280. The threshold compressive force may depend on the deflection force $F_D$ of prongs 282, 284 and/or protrusion 290 and the frictional force between inner surface 286 of prongs 282, 284 and outer surface 292 of protrusion 290. In various embodiments, prongs 282, 284 and/or protrusion 290 may comprise may comprise a metal, such as titanium, aluminum, steel, stainless steel, beryllium copper or other metal or non-metal material having a desired strength, stiffness, and/or flexibility.

FIG. 7B shows releasable restraint 180 in a decoupled state. In various embodiments, at least one of first mating portion 182 and second mating portion 184 may be configured to decouple in response to a tensile force $F_T$ being applied to releasable restraint 180 along longitudinal axis A-A'. For example, in response to tensile force $F_T$ exceeding a threshold tensile force, protrusion 290 may exit receptacle 280. In various embodiments, releasable restraint 180 may be reusable. Releasable restraint 180 may be reassembled by inserting second mating portion 184 back into first mating portion 182 for reuse, for example, during a subsequent deployment of inflatable slide 100. In that regard, first mating portion 182 and second mating portion 184 are configured to be releasably coupled, decoupled, and subsequently recoupled for reuse of releasable restraint 180.

Figure 8:
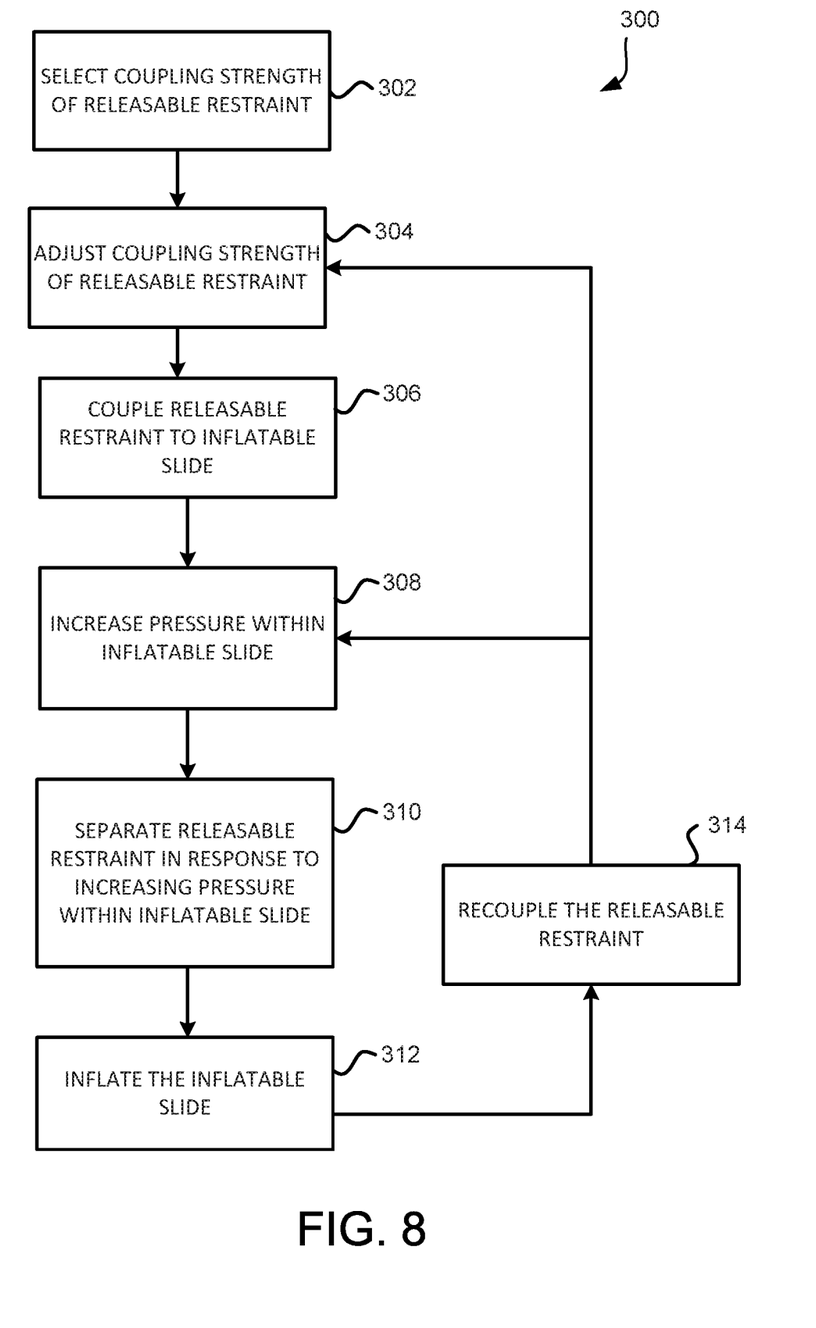
FIG. 8 illustrates a method for deploying an inflatable slide, in accordance with various embodiments.

With reference to FIG. 8, a method 300 for deploying an inflatable slide is provided, in accordance with various embodiments. Method 300 may include the steps of selecting a coupling strength of a releasable restraint (step 302), adjusting the coupling strength of the releasable restraint (step 304), coupling the releasable restraint to the inflatable slide (step 306), increasing pressure within an inflatable slide (step 308), separating the releasable restraint in response to the increasing pressure within the inflatable slide (step 310), and inflating the inflatable slide (step 312).

In various embodiments, the releasable restraint 160 may comprise a first mating portion 162 having a receptacle 220 and may comprise a second mating portion 164 having a protrusion 230. The protrusion 230 may be configured to fit within the receptacle 220.

Step 304 may further include adjusting the coupling strength of the releasable restraint 160 using an adjustment fastener 166 coupled to the releasable restraint 160. Step 304 may further include adjusting the coupling strength of the releasable restraint 160 by decreasing a diameter or width of the receptacle 220 to increase the coupling strength. Step 304 may further include adjusting the coupling strength of the releasable restraint 160 by increasing a diameter or width of the receptacle 220 to decrease the coupling strength.

Step 306 may further include coupling the first mating portion 162 with the second mating portion 164 by applying a compressive force to the mating portions 162, 164.

Step 310 may further comprise decoupling the second mating portion 164 from the first mating portion 162 in response to increasing the pressure within the inflatable slide 100 by deploying the inflatable slide 100. The deployment of inflatable slide 100 may apply a tension force to releasable restraint 160, causing second mating portion 164 to decouple from first mating portion 162. The coupling strength of the releasable restraint may be a magnitude of a threshold tensile force at which the releasable restraint separates or decouples. Second mating portion 162 may be configured to separate from the first mating portion 162 in response to a tensile force $F_T$ applied to the releasable restraint 160 exceeding the threshold tensile force.

Method 300 may further include recoupling the releasable restraint (step 314). Step 310 may further comprise recoupling first mating portion 162 with second mating portion 164. Protrusion 230 may be re-inserted into receptacle 220. After recoupling the releasable restraint 160, any of steps 302 through 312 may be repeated. For example, steps 304 through 312 or steps 308 through 312 may be performed after a first deployment inflatable slide 100. The inflatable slide 100 may be deployed again, by increasing the pressure within inflatable slide 100, causing releasable restraint 160 to separate (decouple) in response to the increased pressure, and allowing the inflatable slide 100 to inflate. Thus, releasable restraint 160 may be reusable.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation system comprising:
    an inflatable slide;
    a releasable restraint coupled to the inflatable slide, the releasable restraint comprising:
        a first mating portion including a receptacle having a first prong and a second prong, wherein the first prong and the second prong are separated by a first width, and
        a second mating portion releasably coupled to the first mating portion, wherein the first mating portion is configured to decouple and recouple with the second mating portion; and
    an adjustment fastener coupled to the second prong, the adjustment fastener configured to increase or decrease the first width to a second width.

2. The evacuation system of claim 1, wherein the second mating portion fits within the receptacle.

3. The evacuation system of claim 2, wherein the adjustment fastener is configured to adjust a coupling strength of the releasable restraint, and wherein the adjustment fastener is configured to apply a compressive force to the first prong and the second prong to adjust a width of the receptacle.

4. The evacuation system of claim 3, wherein the coupling strength of the releasable restraint is a magnitude of a threshold tensile force at which the releasable restraint decouples, and wherein the second mating portion is configured to separate from the first mating portion in response to a tensile force applied the releasable restraint exceeding the threshold tensile force.

5. The evacuation system of claim 4, wherein the tensile force applied to the releasable restraint is due to a pressure increase that causes the inflatable slide to inflate.

6. The evacuation system of claim 5, wherein the inflatable slide is configured to unfold in response to the first mating portion separating from the second mating portion.

7. The evacuation system of claim 1, wherein the second mating portion is configured to couple with the first mating portion in response to a compressive force applied the releasable restraint.

8. A method for deploying an inflatable slide, comprising:
    selecting a coupling strength of a releasable restraint, the releasable restraint comprising:
        a first mating portion having a receptacle; and
        a second mating portion having a protrusion, the protrusion configured to fit within the receptacle, wherein the separating the releasable restraint further comprises decoupling the second mating portion from the first mating portion;
    coupling the releasable restraint to the inflatable slide;
    increasing pressure within the inflatable slide;
    separating the releasable restraint in response to the increasing pressure within the inflatable slide;
    inflating the inflatable slide;
    recoupling the second mating portion with the first mating portion after the decoupling the second mating portion from the first mating portion; and
    adjusting the coupling strength of the releasable restraint by decreasing a diameter of the receptacle.

9. The method of claim 8, further comprising adjusting the coupling strength of the releasable restraint using an adjustment fastener coupled to the releasable restraint, wherein the coupling strength of the releasable restraint is a magnitude of a threshold tensile force at which the releasable restraint separates.

10. The method of claim 8, further comprising, after the recoupling the second mating portion with the first mating portion:
    increasing pressure within the inflatable slide;
    separating the releasable restraint in response to the increasing pressure within the inflatable slide; and
    inflating the inflatable slide.

* * * * *